United States Patent
Bruce et al.

(10) Patent No.: US 8,380,779 B2
(45) Date of Patent: Feb. 19, 2013

(54) TECHNIQUE FOR DETERMINING IF A LOGICAL SUM OF A FIRST OPERAND AND A SECOND OPERAND IS THE SAME AS A THIRD OPERAND

(75) Inventors: Klas M. Bruce, Leander, TX (US); Michael D. Snyder, Cedar Park, TX (US); Ravindraraj Ramaraju, Round Rock, TX (US); David R. Bearden, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 936 days.

(21) Appl. No.: 12/474,451

(22) Filed: May 29, 2009

(65) Prior Publication Data
US 2010/0306302 A1 Dec. 2, 2010

(51) Int. Cl.
G06F 7/50 (2006.01)
(52) U.S. Cl. .. 708/670; 708/671; 711/108; 711/E12.002
(58) Field of Classification Search .................. 708/670, 708/671
See application file for complete search history.

(56) References Cited

U.S. PATENT DOCUMENTS

| | | | |
|---|---|---|---|
| 5,761,521 A * | 6/1998 | Chilinski et al. | 712/1 |
| 6,374,342 B1 | 4/2002 | Sasahara | |
| 6,904,446 B2 * | 6/2005 | Dibrino | 708/501 |
| 8,090,757 B2 * | 1/2012 | Takahashi et al. | 708/491 |
| 2003/0110198 A1 * | 6/2003 | Park | 708/671 |
| 2007/0094479 A1 | 4/2007 | Bearden et al. | |
| 2007/0094480 A1 | 4/2007 | Ramaraju et al. | |

OTHER PUBLICATIONS

Heald, Raymond et al.; "64-KByte Sum-Addressed-Memory Cache with 1.6-ns Cycle and 2.6-ns Latency"; IEEE Journal of Solid-State Circuits; Nov. 1998; pp. 1682-1689; vol. 33, No. 11; IEEE.
Cortadella, Jordi et al.; Evaluation of A + B = K Conditions Without Carry Propagation; IEEE Transactions on Computers; Nov. 1992; pp. 1484-1488; vol. 41, No. 11; IEEE.

* cited by examiner

*Primary Examiner* — Tammara Peyton
(74) *Attorney, Agent, or Firm* — Joanna G. Chiu; David G. Dolezal

(57) ABSTRACT

A system is used to determine if a sum of a first operand and a second operand is the same as a third operand wherein a comparison to the third operand is of variable length. This is particularly useful in a content addressable memory (CAM) where the likelihood of hit is commonly improved over a set associative cache and allows for the CAM to identify different things. For example, an entry can be one length to identify a page of a memory and another entry be a different length to identify a page of memory. This is better understood by reference to the following description and the drawings.

17 Claims, 5 Drawing Sheets

TECHNIQUE FOR DETERMINING IF A LOGICAL SUM OF A FIRST OPERAND AND A SECOND OPERAND IS THE SAME AS A THIRD OPERAND

BACKGROUND

1. Field

This disclosure relates generally to memories, and more specifically, to determining a hit in a content addressable memory.

2. Related Art

Cache memories are common for improving speed. The improved speed is achieved with a high speed memory that is small but fast compared to main memory. Cache accesses may be performed with a variety of techniques. Sometimes these techniques involve the sum of a first operand and a second operand. Caches are useful only when there is a hit in the cache. Because the cycle time of a system may be limited by the cache access speed, it is useful to improve the speed of operation in such a case where the stored data is accessed using the sum of the first and second operands. This quickens access and system speed or allows more entries for a given speed. Also there are benefits to having a cache that can variably size entries. For example, it may desirable to allow variation in how a hit is determined.

Thus, there is a need for a technique that improves upon one or more of the issues described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

A system is used to determine if a sum of a first operand and a second operand is the same as a third operand wherein a comparison to the third operand is of variable length. This is particularly useful in a content addressable memory (CAM) where the likelihood of hit is commonly improved over a limited set associative cache and allows for the CAM to identify different things in different entries. For example, one entry can be one length to identify a page of a memory and another entry can be a different length to identify a page of memory of a different size. This is better understood by reference to the following description and the drawings.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Figure 1:
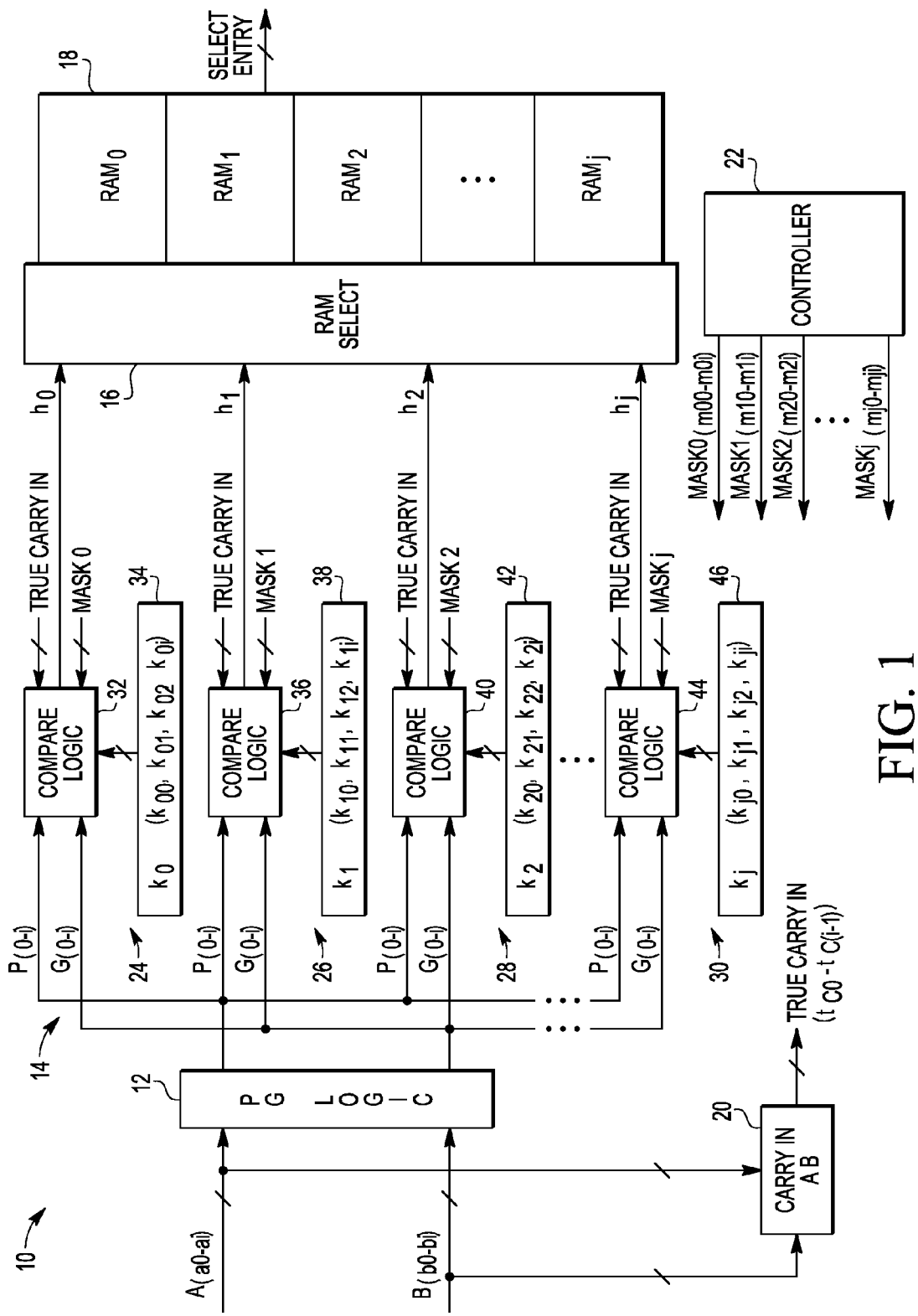
FIG. 1 is a block diagram of a system according to an embodiment of the invention.

Shown in FIG. 1 is a system 10 comprising propagate and generate logic 12, a CAM 14, a carry-in circuit 20, and a controller 22. CAM 14 comprises a RAM select circuit 16, a RAM array 18, and a plurality of rows of which a row 24, a row 26, a row 28, and a row 30 are shown in FIG. 1. Rows 24, 26, 28, and 30 provide inputs h0, h1, h2, and h3, respectively, to RAM select circuit 16. Row 24 comprises compare logic 32 and bitcell portion 34. Row 26 comprises compare logic 36 and bitcell portion 38. Row 28 comprises compare logic 40 and bitcell portion 42. Row 30 comprises compare logic 44 and bitcell portion 46. RAM 18 has a plurality of readable segments of which RAM0, RAM1, RAM2, and RAMj are shown coupled to RAM select circuit 16. Controller 22 provides signals mask0, mask1, mask2, and mask j to logic circuits 32, 36, 40, and 44, respectively.

In operation, system 10 determines if the sum of input signals A and B is the same as the contents of one of the bitcell portions such as bitcell portions 34, 38, 42, and 46 and if there is a hit, then RAM 18 will provide the selected entry as an output. The determination is made concurrently with all of the bitcell portions. As an example, the determination will be explained with regard to bitcell portion 38. Inputs A and B are multi-bit and are shown as a0-ai and b0-bi, respectively. The number of bits is the same as the number of bits of the bitcell portions 34, 38, 42, and 46. For each bit location, propagate and generate circuit 12 provides a propagate signal p and a generate signal g. For example, corresponding to bit location k1 of bitcell portion 38, a propagate signal p1 and a generate signal g1 are generated in response to signal a1 and signal b1. Similarly, propagate signal p2 and generate signal g2 are generated in response to signals a2 and b2. Compare logic 36 receives mask1 which includes bits m10-m1$i$ which identify which portion of bitcell portion 38 is relevant and required carry information. Carry-in logic 20 receives inputs A and B and determines a true carry for each bit location for the most significant bit location to next to least significant bit location shown as signals tc0-tc(i-1). Simply providing the carry information for each bit location is much simpler and faster than having to perform a full add. Thus, carry-in circuit 20 provides the carry information in less than a clock cycle. Compare logic circuit 36 thus uses propagate signals p0-pi, generate signals g0-gi, stored information k10-k1$i$, mask1 signals, and true carry information tC0-tC(i-1) to determine if there is a match between the sum of A and B and the contents of bitcell portion 38. If there is a match, this a considered a hit and signal h1 is asserted which causes RAM select circuit 16 to cause the contents of RAM1 to be provided as the selected output. If there is not a match, this a considered a miss and signal h1 is deasserted so that RAM select circuit 16 does not cause RAM1 to provide its contents as the selected entry. A similar operation is performed with regard to the all of the bit locations to determine if any contents of RAM 18 are output as the selected entry.

Figure 2:
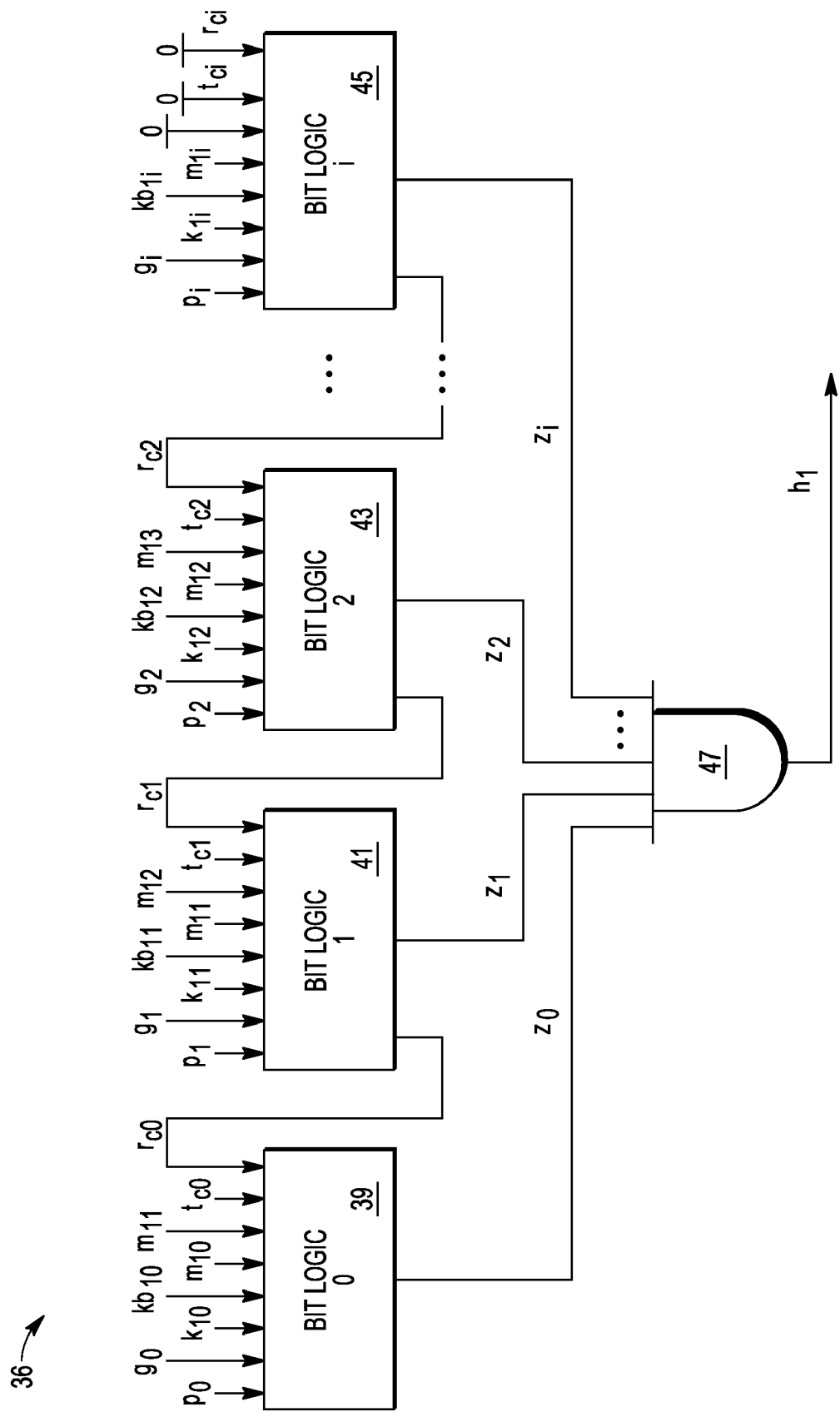
FIG. 2 is a block diagram of first portion of the system of FIG. 1.

Shown in FIG. 2 is logic circuit 36 comprising bit logic 39, bit logic 41, bit logic 43, bit logic 45, and AND circuit 47. Additional logic circuits are present but not shown. Bit logic 39 receives propagate signal p0, generate signal g0, bitcell bit k10, bitcell bit bar kb10, mask m10, mask m11, true carry tc0, and required carry rc0. Bit logic 41 receives propagate signal p1, generate signal g1, bitcell bit k11, bitcell bit bar kb11, mask m11, mask m12, true carry tc1, and required carry rc1. Bit logic 43 receives propagate signal p2, generate signal g2, bitcell bit k12, bitcell bit bar kb12, mask m12, mask m13, true carry TC2, and required carry rc2. Bit logic 45 receives propagate signal pi, generate signal gi, bitcell bit k1i, bitcell bit bar kb1i, mask 1j, a deasserted signal 0 for a second mask signal and deasserted signals 0 for the carry bits. Bit logic circuits 39, 41, 43, and 45 correspond to bit locations, 0, 1, 2, and i, respectively. Bit location 0 in this example is the most significant bit. Thus bit location i is the least significant bit, which is why no carry is provided for that bit.

In operation, each bit logic circuit 39, 41, 43, and 45 may determine if there is a match for its corresponding bit location. Using bit logic circuit 41 as an example, mask signal m11 determines if a compare function is to be performed by bit logic circuit 41. If Mask m11 is asserted then a compare is performed. If Mask m11 is deasserted, then the output z1 is asserted and no comparison is required. When the mask signal associated with the bit logic is deasserted, there is no need for a carry. If mask m12 is asserted, the required carry rc1 is used. If mask m12 is deasserted, then true carry tc1 is used. When the preceding bit location is not performing a compare but the present bit location is, then the true carry must be used because the required carry is not valid. If both the preceding and present bit location are performing a compare then the required carry is valid. The required carry can be generated faster than the true carry so is preferred when available. Also the true carry may become prohibitively slow when near the most significant bit. The compare is performed by adding the bitcell value to the propagate value and comparing to the carry. If they are the same that is a hit for that bit location. If they are different then there is a miss for that bit location which also means there is a miss for the compare logic. Thus, for bit logic 41, propagate signal p1 is added to signal k11 and compared to either required carry rc1 or true carry tc1. If the comparison is that they are the same, then that is a hit. If they are different, then that is a miss. Generate signal g1 is used to provide the required carry signal for the next bit location. Thus, if generate signal g1 is asserted, then required carry signal rc0 is asserted to bit logic 39. Required carry rc0 can also be asserted by signal k11 being deasserted and propagate signal p1 being asserted.

Figure 3:
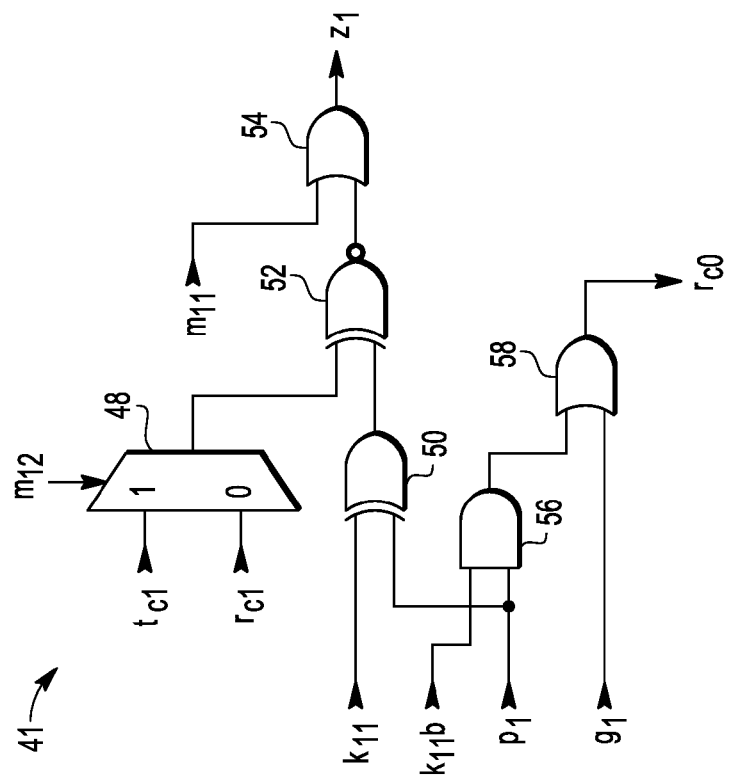
FIG. 3 is a block diagram of a portion of the first portion shown in FIG. 2.

Shown in FIG. 3 is a logic diagram of bit logic 41. Bit logic 41 comprises a multiplexer 48, an Exclusive OR gate 50, an Exclusive NOR gate 52, an OR gate 54, an AND gate 56, and an OR gate 58. Multiplexer 48 has a first input for receiving true carry tc1, a second input for receiving required carry rc1, a select input for receiving mask m12, and an output. Exclusive OR gate 50 has a first input for receiving signal k11, a second input for receiving propagate signal p1, and an output. Exclusive NOR gate 52 has a first input coupled to the output of multiplexer 48, a second input coupled to the output of Exclusive OR gate 50, and an output. OR gate 54 has a first input for receiving mask signal m11, a second input coupled to the output of Exclusive NOR gate 52, and an output providing signal z1. AND gate 56 has a first input for receiving signal k11b, which is the logical complement of signal k11, a second input for receiving signal p1, and an output. OR gate 58 has a first input coupled to the output of AND gate 56, a second input for receiving generate signal g1, and an output for providing required carry signal RC0.

In operation, Exclusive OR gate 50 functions as an adder so that a zero (logic low) is output when signals p11 and k11 both are a one or both are a zero. Otherwise a one is output by Exclusive OR gate 50. Multiplexer 48 provides the proper carry to the first input of Exclusive NOR gate 52. Exclusive NOR gate 52 responds by providing a logic high output if the carry, signal tc1 or tc1, and the output of Exclusive OR gate are the same. This is a match which is also commonly called a hit. If the inputs to Exclusive NOR gate are different a logic low is output and that indicates a miss. OR gate 54 provides a hit signal z1 at a logic low, which indicates a miss, if both the output of Exclusive NOR gate 52 and mask m1 are a logic low. Mask m11 can force a hit by being a logic high. This would occur, for example, if the bit location corresponding to bit logic 41 does not have data that is relevant. AND gate 56 provides a logic high if both signal kb11 and propagate signal p1 are a logic high. Or gate 58 provides required carry rc0 at logic high, representing a one, if the output of AND gate 56 is a logic high or generate signal g1 is a logic high. Thus a carry is indicated for the next bit location if either the generate signal is a logic high or the stored logic state is a logic low and the propagate signal is a logic high.

Figure 4:
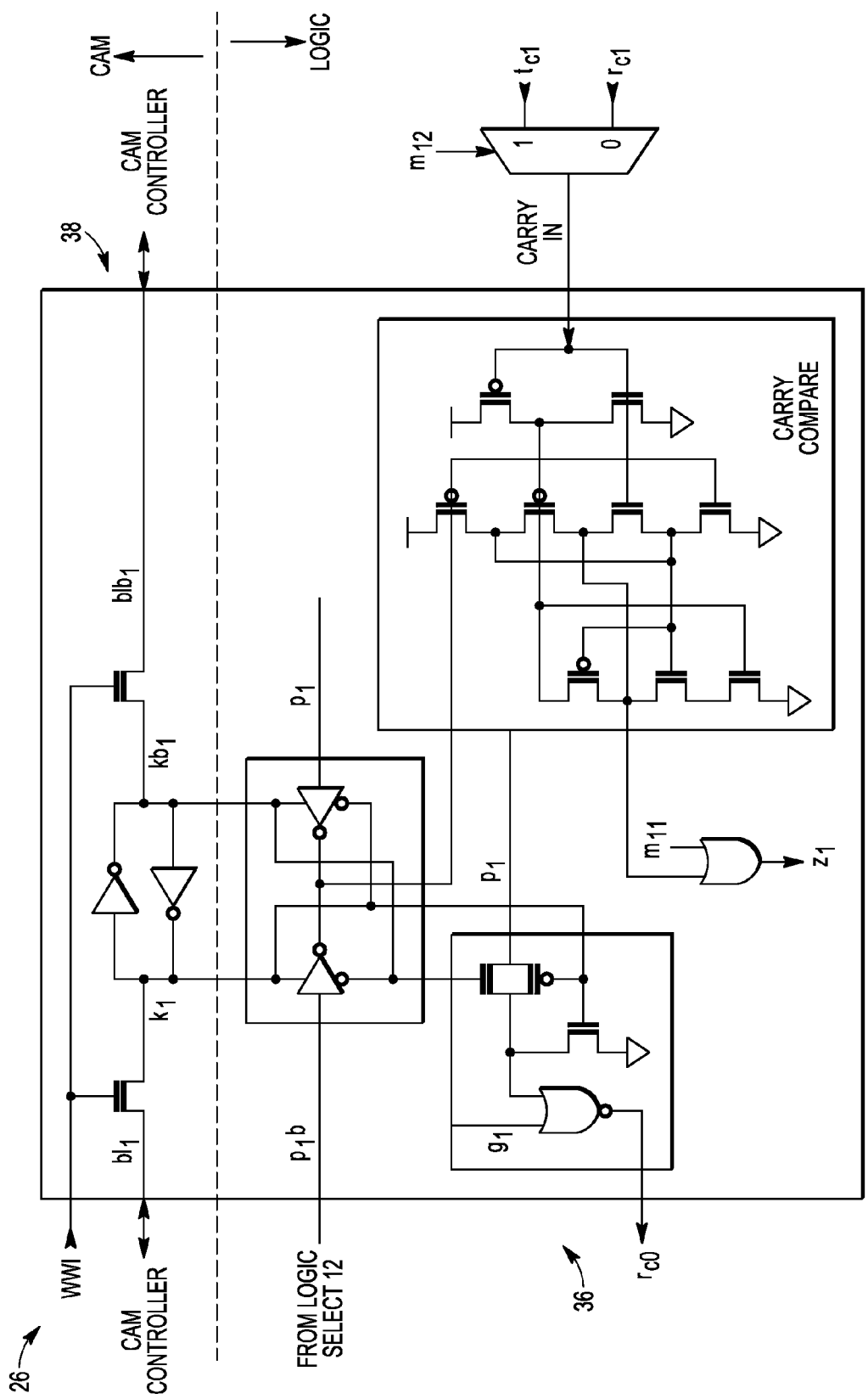
FIG. 4 is a circuit diagram of the portion of the first portion shown in FIG. 3 and a portion of the block diagram shown in FIG. 1.

Shown in FIG. 4 is a circuit using N and P channel transistors implementing compare logic 41. The P channel transistors are indicated by a small circle on the gate symbol.

Figure 5:
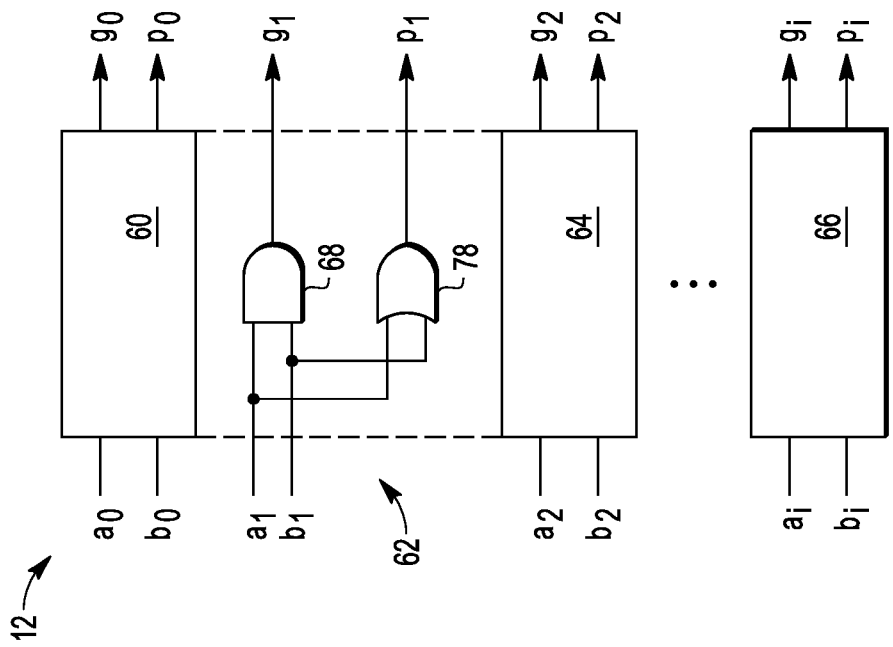
FIG. 5 is a block diagram of a second portion of the system of FIG. 1.

Shown in FIG. 5 is a combination block diagram and logic diagram of propagate and generate circuit 12 comprising a propagate and generate block 60, a propagate and generate block 62, a propagate and generate block 64, and a propagate and generate block 66. Propagate and generate block 62 is shown comprising an AND gate 68 and an Exclusive OR gate 70. AND gate 68 has a first input for receiving signal a1, a second input for receiving signal b1, and an output for providing generate signal g1. Exclusive OR gate 70 has first input for receiving signal a1, a second input for receiving signal b1, and an output for providing propagate signal p1. Generate signal g1 is provided as a logic high when both signals a1 and b1 are a logic high and otherwise is provided as a logic low. Propagate signal p1 is provided as a logic high when signals a1 and b1 are different and a logic low when signals a1 and b1 are the same. Blocks 60, 64, and 66 operate in the same way with regard to the a and b signals they receive. Each of blocks 60, 62, 64, and 66 correspond to a bit location in CAM 14. Block 62 for example corresponds to bit location 1 in bitcell portions 34, 38, 42, and 46. Similarly blocks 60, 64, and 66 correspond to bit locations 0, 2, and l, respectively. Blocks 60, 62, 64, and 66 each provide the propagate and generate signals to compare logic 32, 36, 40, and 44, respectively, for the bit location to which they correspond.

The combination of a propagate and generate block and a bit logic circuit effectively form an adder of a bit location of signals A and B and a comparison to that same bit location in stored entry K. For example, bit logic 41 and propagate and generate block 62 correspond to bit location 1. Thus, propagate and generate block 62 and bit logic 41 together function to be equivalent to an add of signals A and B that results in a value for bit location 1 and compare that value to the value of k11, which is the value stored in bit location 1 of bit cell portion 38. This function of propagate and generate of block 62 and bit logic 41 can be considered a logic operation on a bit location. This logic operation can also be viewed as achieving this result by performing a full add of single bits of signal A, signal B, and Kb (complement of K) at the particular bit location with the real carry signal for the next most significant bit location being the carry of the add. This logic operation is performed on each bit location of a bitcell portion that is within the selected length for that bitcell portion. For example, if bitcell portion includes bit locations 0-7, then the logic operation is performed on each of bit locations 0-7, which is eight bit locations. These bit operations can be performed concurrently by the bit logic circuits, such as bit logic 39, 41, 43 and 45 shown in FIG. 2. The generation of the true carry is a little slower for the more significant bits, but the bit logic circuits are not in a chain in which a signal propagates through them serially. Thus, they can function concurrently.

Figure 6:
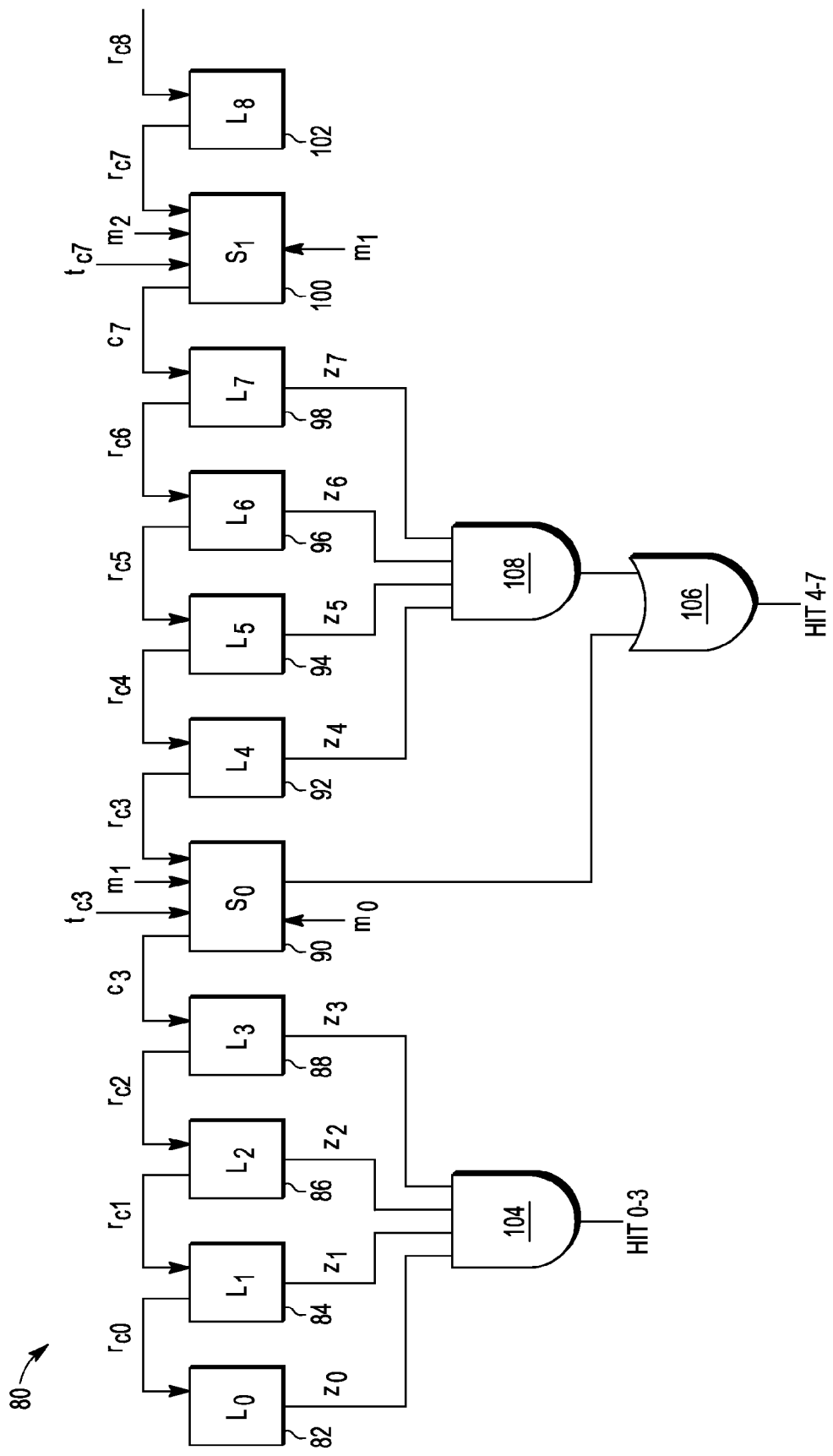
FIG. 6 is a block diagram of a portion of a system according to an alternative embodiment.

Shown in FIG. 6 is compare logic 80 that may be used in an alternative embodiment. In the case of system 10, the various compare logic circuits, such as compare logic 36, has the ability to define the length of an operand between any two bits. This can cause delays that may be excessive. Compare logic 80 is limited to defining the operand length on every fourth bit location. Compare logic 80 has bit logic for each bit location. Shown in FIG. 6 are bit logic 82, bit logic 84, bit logic 86, bit logic 88, bit logic 92, bit logic 94, bit logic 96, bit logic 98, and bit logic 102 corresponding to bit locations k0, k1, k2, k3, k4, k5, k6, k7, and k8, respectively. Each bit logic circuit provides the required carry to the next most significant bit location except for every fourth bit location where the true carry may be used instead. Between every fourth bit logic is a size logic circuit. Shown in FIG. 6 are size logic 90 between bit logic 88 and bit logic 90 and size logic 100 between bit logic 98 and bit logic 102 which is between the bit logic circuits corresponding to bit location 4 and bit location 3. Bit logic 92 outputs required carry rc3 to size logic 90. Size logic 90 also receives true carry tc3. Size logic 90 also receives a mask signal m0 from the controller. In this case mask signal m0 indicates if the size includes those locations and thus also if the true carry should be coupled to bit logic 88. Bit logic 90 outputs carry signal c3 to bit logic 88 which thus may be either true carry tc3 or required carry rc3 in response to mask m0. A size logic circuit, size logic 100, is between bit logic 98 and bit logic 102 and similarly performs a selection between true carry tc7 and required carry rc7 for coupling as carry signal c7 to bit logic 98. At the point at which the boundary is set, all less significant bits are considered a hit. Shown in FIG. 6 is an AND gate 108 which has inputs connected to the hit/miss outputs z4, z5, z6, and z7 of logic and asserts an output if all of these hit/miss outputs are asserted. Also shown is an OR gate 106 that has an input coupled to the output of AND gate 108 and an input coupled to mask m0. If mask m1 is deasserted meaning that the boundary does not include the previous locations, then OR gate 106 asserts an output indicating a hit for bit locations 4-7. That is to say, bit locations not within the length of the operand are forced to indicate a hit. The most significant four bits in this example are always considered to be within the operand length so only have a single AND gate 104 to indicate a hit or miss for those four bit locations.

By now it should be appreciated that there has been provided a circuit comprising an input to receive a first operand, an input to receive a second operand, a first circuit for providing a length indication, and a logic circuit for providing an indication of a match between a logical sum of the first operand and the second operand with a set of bits of a third operand. A length of the set of bits is determined by the length indication. The first operand includes a first plurality of bits. The second operand includes a second plurality of bits. The logic circuit generates the indication of the match by performing a plurality of bit logic operations. Each of the plurality of bit logic operations includes a logic operation on a bit of the first operand of a corresponding bit location, a bit of a second operand of the corresponding bit location, and a bit of the third operand of the corresponding bit location to generate a result and comparing the result with a carry indication generated from a logic operation on bits including bits of an immediately less significant bit location from the corresponding bit location. Each of the bit logic operations of the plurality of bit logic operations is performed for a different corresponding bit location of a plurality of bit locations. The circuit may further comprise a first carry determination circuit, the first carry determination circuit generating a first carry indication of at least one bit of carry bits of an add operation of the first operand and the second operand; and a selection circuit; wherein the selection circuit selects, based on the length indication, one of a group consisting of a bit of the first carry indication and a second carry indication generated from a logic operation on one bit of the first operand of a first bit location, one bit of the second operand of the first bit location, and one bit of the third operand of the first bit location, as the carry indication for the bit logic operation of an adjacent less significant bit location to the first bit location. The circuit may be further characterized by, for the bit location, a bit logic operation of the plurality of bit logic operations being for generating a result of a bit addition of a bit of the first operand, a bit of a second operand, and a bit of the third operand, and a comparison of the result with the one of the group. The circuit may be further characterized by the bit logic operation for generating the result using a first representation of a bit of the third operand, wherein the logic operation to generate the second carry indication uses a second representation of the bit of the third operation, wherein the second representation is complementary to the first representation. The circuit may be further characterized by each of the plurality of bit logic operations performed by the logic circuit generating a bit result of a plurality of bit results, the logic circuit masks the plurality of bit results as per the length indication. The circuit may further comprise a first carry determination circuit, the first carry determination circuit generating a first carry indication of at least one bit of carry bits of an add operation of the first operand and the second operand; wherein for each bit location of a first subset of the plurality of bit locations, the carry indication is selected, based on the length indication, from one of a group consisting of a bit of the first carry indication and a second carry indication generated from a logic operation on one bit of the first operand of an immediately less significant bit location to each bit location of the first subset, one bit of the second operand of the immediately less significant bit location to each bit location of the first subset, and one bit of the third operand of the immediately less significant bit location to each bit location of the first subset; and wherein for each bit of a second subset of the plurality of bit locations, the carry indication is generated from a logic operation on one bit of the first operand of an immediately less significant bit location to each bit location of the second subset, one bit of the second operand of the immediately less significant bit location to each bit location of the second subset, and one bit of the third operand of the immediately less significant bit location to each bit location of the second subset. The circuit may be further characterized by a bit location of the first subset occurring at every fourth bit location of the plurality of bit locations wherein intervening three bit locations are bit locations of the second subset. The circuit may be further characterized by the second subset having a greater number of bit locations of the plurality of bit locations than the first subset. The circuit may be further characterized by the logic circuit being implemented in a content addressable memory, the third operand being stored in a storage location of a plurality of storage locations of the content addressable memory, the logic circuit generating a plurality of indications wherein each indication of the plurality is an indication of a match between a logical sum of the first operand and the second operand with a set of bits of a value from each storage location of the plurality of storage locations, wherein the length of the set of bits for each storage location is determined by the length indication. The circuit may be further characterized by the length indication for a first storage location of the plurality of storage locations being capable of indicating a different length than for a second storage location of the plurality of storage locations.

Also described is a method of comparing a logical sum of a first operand and second operand with a third operand. The method includes receiving a first operand by logic circuitry. The method further includes receiving a second operand by the logic circuitry. The method further includes receiving a length indication by the logic circuitry. The method further includes generating, by the logic circuitry, an indication of a match between a logical sum of the first operand and the second operand with a set of bits of a third operand, wherein the length of the set of bits is determined by the length indication. The generating includes performing a plurality of bit logic operations by the logic circuitry, wherein each bit logic operation of the plurality of bit logic operations corresponds to a bit position of a plurality of bit positions, wherein each of the plurality of bit logic operations includes performing a logic operation on a bit of the first operand of a corresponding bit location of the plurality of bit locations, a bit of a second operand of the corresponding bit location, and a bit of the third operand of the corresponding bit location to generate a result and comparing the result with a carry indication generated from a logic operation on bits including bits of an immediately less significant bit location from the corresponding bit location. The method may further comprise generating a first carry indication of at least one bit of a plurality of carry bits of an add operation of the first operand and the second operand; selecting, based on the length indication, one of a group consisting of a bit of the first carry indication and a second carry indication generated from a logic operation on one bit of the first operand of a first bit location, one bit of the second operand of the first bit location, and one bit of the third operand of the first bit location; wherein for a next significant bit location to the first bit location, the carry indication used for the bit logic operation of the plurality of logic operations as the selected one of the group. The method may be further characterized by the logic operation for generating the second carry indication including an addition operation of the one bit of the first operand of a first bit location, the one bit of the second operand of the first bit location, and the one bit of the third operand of the first bit location. The method may be further characterized by the performing a plurality of bit logic operations generating a plurality of bit results; and the generating an indication of a match including masking the plurality of the bit results as per the length indication. The method may further comprise generating a first carry indication of at least one bit of a plurality of carry bits of an add operation of the first operand and the second operand; wherein for each bit location of a first subset of the plurality of bit locations, the carry indication is selected, based on the length indication, from one of a group consisting of a bit of the first carry indication and a second carry indication generated from a logic operation on one bit of the first operand of an immediately less significant bit location to each bit location of the first subset, one bit of the second operand of the immediately less significant bit location to each bit location of the first subset, and one bit of the third operand of the immediately less significant bit location to each bit location of the first subset; and wherein for each bit of a second subset of the plurality of bit locations, the carry indication is a carry indication is generated from a logic operation on one bit of the first operand of an immediately less significant bit location to each bit location of the second subset, one bit of the second operand of the immediately less significant bit location to each bit location of the second subset, and one bit of the third operand of the immediately less significant bit location to each bit location of the second subset.

Described also is a content addressable memory that includes a an input to receive a first operand, an input to receive a second operand, a plurality of storage locations, and logic circuitry for providing a plurality of indications where each indication of the plurality of indications corresponds to a storage location of the plurality of storage locations, wherein each indication of the plurality of indications is an indication of a match between a logical sum of the first operand and the second operand with a set of bits of a value from a corresponding storage location of the plurality of storage locations. F or each indication of the plurality of indications, the logic circuit generates the indication of the match by performing a plurality of bit logic operations, wherein each of the plurality of bit logic operations includes a logic operation on a bit of the first operand of a corresponding bit location, a bit of a second operand of the corresponding bit location, and a bit of the corresponding bit location of a value from the corresponding storage location to generate a result and comparing the result to a carry indication generated from a logic operation on bits including bits of an immediately less significant bit location from the corresponding bit location, wherein each of the bit operations of the plurality is performed for a different corresponding bit location of a plurality of bit locations. The content addressable memory may be further characterized by, for each indication of the plurality of indications, each of the plurality of bit logic operations including a bit addition of the bit of the first operand of a corresponding bit location, the bit of a second operand of the corresponding bit location, and the bit of the corresponding bit location of the value from corresponding storage location. The content addressable memory may further comprise a first circuit for providing a length indication, wherein for each indication of the plurality of indications, the bit length of the set of bits is determined by the length indication. The content addressable memory may further comprise a first carry determination circuit, the first carry determination circuit generating a first carry indication of at least one bit of carry bits of an add operation of the first operand and the second operand, wherein for each indication of the plurality of indications, for each bit location of at least some bit locations of the plurality of bit locations, the carry indication is selected, based on the length indication, from one of a group consisting of a bit of the first carry indication and a second carry indication generated from a logic operation on one bit of the first operand of an immediately less significant bit location to each bit location, one bit of the second operand of the immediately less significant bit location to each bit location, and one bit of a value from a corresponding storage location of the immediately less significant bit location to each bit location. The content addressable memory may further comprise a first carry determination circuit, the first carry determination circuit generating a first carry indication of at least one bit of carry bits of an add operation of the first operand and the second operand, wherein for each indication of the plurality of indications, for each bit location of a first subset of the plurality of bit locations, the carry indication is selected, based on the length indication, from one of a group consisting of a bit of the first carry indication and a second carry indication generated from a logic operation on one bit of the first operand of an immediately less significant bit location to each bit location of the first subset, one bit of the second operand of the immediately less significant bit location to each bit location of the first subset, and one bit of a value from a corresponding storage location of the immediately less significant bit location to each bit location of the first subset, and for each bit of a second subset of the plurality of bit locations, the carry indication is generated from a logic operation on one bit of the first operand of an immediately less significant bit location to each bit location of the second subset, one bit of the second operand of the immediately less significant bit location to each bit location of the second subset, and one bit of a value from a corresponding storage location of the immediately less significant bit location to each bit location of the second subset.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. For example, a different circuit may be used for implementing the logic shown in FIG. 3. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A circuit comprising:
   an input to receive a first operand, the first operand including a first plurality of bits;
   an input to receive a second operand, the second operand including a second plurality of bits;
   a first circuit for providing a length indication; and
   a logic circuit for providing an indication of a match between a logical sum of the first operand and the second operand with a set of bits of a third operand, wherein a length of the set of bits is determined by the length indication,
   wherein the logic circuit generates the indication of the match by performing a plurality of bit logic operations, wherein each of the plurality of bit logic operations includes a logic operation on a bit of the first operand of a corresponding bit location, a bit of a second operand of the corresponding bit location, and a bit of the third operand of the corresponding bit location to generate a result and comparing the result with a carry indication generated from a logic operation on bits including bits of an immediately less significant bit location from the corresponding bit location, wherein each of the bit logic operations of the plurality of bit logic operations is performed for a different corresponding bit location of a plurality of bit locations, and
   wherein each of the plurality of bit logic operations performed by the logic circuit generates a bit result of a plurality of bit results, the logic circuit masks the plurality of bit results as per the length indication.

2. A circuit comprising:
   an input to receive a first operand, the first operand including a first plurality of bits;
   an input to receive a second operand, the second operand including a second plurality of bits;
   a first circuit for providing a length indication;
   a logic circuit for providing an indication of a match between a logical sum of the first operand and the second operand with a set of bits of a third operand, wherein a length of the set of bits is determined by the length indication,
   wherein the logic circuit generates the indication of the match by performing a plurality of bit logic operations, wherein each of the plurality of bit logic operations includes a logic operation on a bit of the first operand of a corresponding bit location, a bit of a second operand of the corresponding bit location, and a bit of the third operand of the corresponding bit location to generate a result and comparing the result with a carry indication generated from a logic operation on bits including bits of an immediately less significant bit location from the corresponding bit location, wherein each of the bit logic operations of the plurality of bit logic operations is performed for a different corresponding bit location of a plurality of bit locations;
   a first carry determination circuit, the first carry determination circuit generating a first carry indication of at least one bit of carry bits of an add operation of the first operand and the second operand; and
   a selection circuit;
   wherein the selection circuit selects, based on the length indication, one of a group consisting of a bit of the first carry indication and a second carry indication generated from a logic operation on one bit of the first operand of a first bit location, one bit of the second operand of the first bit location, and one bit of the third operand of the first bit location, as the carry indication for the bit logic operation of an adjacent less significant bit location to the first bit location.

3. The circuit of claim 2 wherein:
   for the bit location, a bit logic operation of the plurality of bit logic operations is for generating a result of a bit addition of a bit of the first operand, a bit of a second operand, and a bit of the third operand, and a comparison of the result with the one of the group.

4. The circuit of claim 2 wherein the bit logic operation for generating the result uses a first representation of a bit of the third operand, wherein the logic operation to generate the second carry indication uses a second representation of the bit of the third operation, wherein the second representation is complementary to the first representation.

5. A circuit comprising:
an input to receive a first operand, the first operand including a first plurality of bits;
an input to receive a second operand, the second operand including a second plurality of bits;
a first circuit for providing a length indication;
a logic circuit for providing an indication of a match between a logical sum of the first operand and the second operand with a set of bits of a third operand, wherein a length of the set of bits is determined by the length indication,
wherein the logic circuit generates the indication of the match by performing a plurality of bit logic operations, wherein each of the plurality of bit logic operations includes a logic operation on a bit of the first operand of a corresponding bit location, a bit of a second operand of the corresponding bit location, and a bit of the third operand of the corresponding bit location to generate a result and comparing the result with a carry indication generated from a logic operation on bits including bits of an immediately less significant bit location from the corresponding bit location, wherein each of the bit logic operations of the plurality of bit logic operations is performed for a different corresponding bit location of a plurality of bit locations;
a first carry determination circuit, the first carry determination circuit generating a first carry indication of at least one bit of carry bits of an add operation of the first operand and the second operand;
wherein for each bit location of a first subset of the plurality of bit locations, the carry indication is selected, based on the length indication, from one of a group consisting of a bit of the first carry indication and a second carry indication generated from a logic operation on one bit of the first operand of an immediately less significant bit location to each bit location of the first subset, one bit of the second operand of the immediately less significant bit location to each bit location of the first subset, and one bit of the third operand of the immediately less significant bit location to each bit location of the first subset;
wherein for each bit of a second subset of the plurality of bit locations, the carry indication is generated from a logic operation on one bit of the first operand of an immediately less significant bit location to each bit location of the second subset, one bit of the second operand of the immediately less significant bit location to each bit location of the second subset, and one bit of the third operand of the immediately less significant bit location to each bit location of the second subset.

6. The circuit of claim 5 wherein a bit location of the first subset occurs at every fourth bit location of the plurality of bit locations wherein intervening three bit locations are bit locations of the second subset.

7. The circuit of claim 5 wherein the second subset has a greater number of bit locations of the plurality of bit locations than the first subset.

8. The circuit of claim 1 wherein the logic circuit is implemented in a content addressable memory, the third operand is stored in a storage location of a plurality of storage locations of the content addressable memory, the logic circuit generates a plurality of indications wherein each indication of the plurality is an indication of a match between a logical sum of the first operand and the second operand with a set of bits of a value from each storage location of the plurality of storage locations, wherein the length of the set of bits for each storage location is determined by the length indication.

9. The circuit of claim 8 wherein the length indication for a first storage location of the plurality of storage locations may indicate a different length than for a second storage location of the plurality of storage locations.

10. A method of comparing a logical sum of a first operand and second operand with a third operand, the method comprising:
receiving a first operand by logic circuitry;
receiving a second operand by the logic circuitry;
receiving a length indication by the logic circuitry; and
generating, by the logic circuitry, an indication of a match between a logical sum of the first operand and the second operand with a set of bits of a third operand, wherein the length of the set of bits is determined by the length indication;
wherein the generating includes:
performing a plurality of bit logic operations by the logic circuitry, wherein each bit logic operation on the plurality of bit logic operations corresponds to a bit position of a plurality of bit positions, wherein each of the plurality of bit logic operations includes performing a logic operation on a bit of the first operand of a corresponding bit location of the plurality of bit locations, a bit of a second operand of the corresponding bit location, and a bit of the third operand of the corresponding bit location to generate a result and comparing the result with a carry indication generated from a logic operation on bits including bits of an immediately less significant bit location from the corresponding bit location;
generating a first carry indication of at least one bit of a plurality of carry bits of an add operation of the first operand and the second operand;
selecting, based on the length indication, one of a group consisting of a bit of the first carry indication and a second carry indication generated from a logic operation on one bit of the first operand of a first bit location, one bit of the second operand of the first bit location, and one bit of the third operand of the first bit location;
wherein for a next significant bit location to the first bit location, the carry indication used for the bit logic operation of the plurality of logic operations as the selected one of the group.

11. The method of claim 10 wherein the logic operation for generating the second carry indication includes an addition operation of the one bit of the first operand of a first bit location, the one bit of the second operand of the first bit location, and the one bit of the third operand of the first bit location.

12. The method of claim 10 wherein:
the performing a plurality of bit logic operations generates a plurality of bit results; and
the generating an indication of a match includes masking the plurality of the bit results as per the length indication.

13. A method of comparing a logical sum of a first operand and second operand with a third operand, the method comprising:
receiving a first operand by logic circuitry;
receiving a second operand by the logic circuitry;
receiving a length indication by the logic circuitry; and
generating, by the logic circuitry, an indication of a match between a logical sum of the first operand and the second operand with a set of bits of a third operand, wherein the length of the set of bits is determined by the length indication;
wherein the generating includes:

performing a plurality of bit logic operations by the logic circuitry, wherein each bit logic operation on the plurality of bit logic operations corresponds to a bit position of a plurality of bit positions, wherein each of the plurality of bit logic operations includes performing a logic operation on a bit of the first operand of a corresponding bit location of the plurality of bit locations, a bit of a second operand of the corresponding bit location, and a bit of the third operand of the corresponding bit location to generate a result and comparing the result with a carry indication generated from a logic operation on bits including bits of an immediately less significant bit location from the corresponding bit location;

generating a first carry indication of at least one bit of a plurality of carry bits of an add operation of the first operand and the second operand;

wherein for each bit location of a first subset of the plurality of bit locations, the carry indication is selected, based on the length indication, from one of a group consisting of a bit of the first carry indication and a second carry indication generated from a logic operation on one bit of the first operand of an immediately less significant bit location to each bit location of the first subset, one bit of the second operand of the immediately less significant bit location to each bit location of the first subset, and one bit of the third operand of the immediately less significant bit location to each bit location of the first subset;

wherein for each bit of a second subset of the plurality of bit locations, the carry indication is a carry indication is generated from a logic operation on one bit of the first operand of an immediately less significant bit location to each bit location of the second subset, one bit of the second operand of the immediately less significant bit location to each bit location of the second subset, and one bit of the third operand of the immediately less significant bit location to each bit location of the second subset.

14. A content addressable memory, comprising:
an input to receive a first operand;
an input to receive a second operand;
a plurality of storage locations;
logic circuitry for providing a plurality of indications where each indication of the plurality of indications corresponds to a storage location of the plurality of storage locations, wherein each indication of the plurality of indications is an indication of a match between a logical sum of the first operand and the second operand with a set of bits of a value from a corresponding storage location of the plurality of storage locations;
wherein for each indication of the plurality of indications, the logic circuit generates the indication of the match by performing a plurality of bit logic operations, wherein each of the plurality of bit logic operations includes a logic operation on a bit of the first operand of a corresponding bit location, a bit of a second operand of the corresponding bit location, and a bit of the corresponding bit location of a value from the corresponding storage location to generate a result and comparing the result to a carry indication generated from a logic operation on bits including bits of an immediately less significant bit location from the corresponding bit location, wherein each of the bit operations of the plurality is performed for a different corresponding bit location of a plurality of bit locations;
a first carry determination circuit, the first carry determination circuit generating a first carry indication of at least one bit of carry bits of an add operation of the first operand and the second operand;
wherein for each indication of the plurality of indications:
for each bit location of at least some bit locations of the plurality of bit locations, the carry indication is selected, based on the length indication, from one of a group consisting of a bit of the first carry indication and a second carry indication generated from a logic operation on one bit of the first operand of an immediately less significant bit location to each bit location, one bit of the second operand of the immediately less significant bit location to each bit location, and one bit of a value from a corresponding storage location of the immediately less significant bit location to each bit location.

15. The content addressable memory of claim 14 wherein for each indication of the plurality of indications, each of the plurality of bit logic operations includes a bit addition of the bit of the first operand of a corresponding bit location, the bit of a second operand of the corresponding bit location, and the bit of the corresponding bit location of the value from corresponding storage location.

16. The content addressable memory of claim 14 further comprising:
a first circuit for providing a length indication;
wherein for each indication of the plurality of indications, the bit length of the set of bits is determined by the length indication.

17. The content addressable memory of claim 14, wherein the at least some bit locations of the plurality of bit locations is a first subset of the plurality of bit locations, and
wherein for each indication of the plurality of indications:
for each bit of a second subset of the plurality of bit locations, the carry indication is generated from a logic operation on one bit of the first operand of an immediately less significant bit location to each bit location of the second subset, one bit of the second operand of the immediately less significant bit location to each bit location of the second subset, and one bit of a value from a corresponding storage location of the immediately less significant bit location to each bit location of the second subset.

* * * * *